(12) United States Patent
Voglewede et al.

(10) Patent No.: US 7,710,265 B2
(45) Date of Patent: May 4, 2010

(54) SYSTEMS AND METHODS FOR DYNAMIC SITUATIONAL SIGNAL PROCESSING FOR TARGET DETECTION AND CLASSIFICATION

(75) Inventors: Paul Edward Voglewede, N. Chili, NY (US); Scott J. Cloutier, Fairport, NY (US); Michael D. Jordan, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 338 days.

(21) Appl. No.: 11/593,890

(22) Filed: Nov. 7, 2006

(65) Prior Publication Data

US 2008/0106403 A1 May 8, 2008

(51) Int. Cl.
G08B 1/08 (2006.01)
G08B 21/00 (2006.01)
G01V 1/00 (2006.01)
G01V 1/28 (2006.01)

(52) U.S. Cl. .................... 340/539.26; 340/690; 702/15; 702/17

(58) Field of Classification Search ............ 340/539.15, 340/500, 501, 539.1, 539.11, 539.26, 690; 702/14, 15, 17, 16, 18
See application file for complete search history.

(56) References Cited

U.S. PATENT DOCUMENTS

| | | | |
|---|---|---|---|
| 3,903,512 A | 9/1975 | Laymon | |
| 4,314,347 A | 2/1982 | Stokely | |
| 4,480,480 A | 11/1984 | Scott et al. | |
| 5,315,232 A | 5/1994 | Stewart | |
| 5,373,486 A * | 12/1994 | Dowla et al. ................ | 367/135 |
| 5,760,696 A * | 6/1998 | Sadri et al. ................... | 340/690 |
| 5,801,636 A * | 9/1998 | Tatom et al. ................. | 340/690 |
| 6,356,204 B1 * | 3/2002 | Guindi et al. ............... | 340/690 |
| 6,631,096 B2 | 10/2003 | Gillis et al. | |
| 6,731,214 B2 * | 5/2004 | Kuo ......................... | 340/573.1 |
| 6,731,220 B2 * | 5/2004 | Chen et al. ................... | 340/690 |

(Continued)

FOREIGN PATENT DOCUMENTS

WO WO 0101366 A2 1/2001

(Continued)

OTHER PUBLICATIONS

K. Houston, D. McGaffigan, "Spectrum Analysis Techniques for Personnel Detection Using Seismic Sensors," Proceedings of SPIE vol. 5090 (2003).

(Continued)

*Primary Examiner*—Jennifer Mehmood
(74) *Attorney, Agent, or Firm*—McAndrews, Held & Malloy, Ltd.

(57) ABSTRACT

Certain embodiments of the present invention provide a system for improved signal processing within a remote sensor system. The system includes a detection component and a processing component. The detection component is adapted to detect an event and generate a signal based at least in part on the event. The processing component adapted to process a signal based at least in part on a situation. Certain embodiments of the present invention provide a method for improved signal processing within a remote sensor system. The method includes determining a situation, detecting an event, generating a signal based at least in part on the event, and processing the signal based at least in part on the situational parameter.

22 Claims, 10 Drawing Sheets

U.S. PATENT DOCUMENTS

| | | | |
|---|---|---|---|
| 6,873,265 B2* | 3/2005 | Bleier | 340/690 |
| 6,950,786 B1* | 9/2005 | Sonneland et al. | 703/2 |
| 6,952,649 B2* | 10/2005 | Cook et al. | 702/14 |
| 7,047,161 B1 | 5/2006 | Friesel | |
| 7,308,139 B2* | 12/2007 | Wentland et al. | 382/181 |
| 7,499,900 B2* | 3/2009 | Biger et al. | 706/47 |
| 2002/0154010 A1 | 10/2002 | Tu et al. | |
| 2003/0186663 A1 | 10/2003 | Chen et al. | |
| 2004/0236189 A1 | 11/2004 | Hawthorne et al. | |
| 2005/0093706 A1 | 5/2005 | Hoenig | |
| 2005/0163293 A1 | 7/2005 | Hawthorne et al. | |
| 2005/0177615 A1 | 8/2005 | Hawthorne et al. | |
| 2005/0258969 A1 | 11/2005 | Hoenig | |
| 2005/0275527 A1 | 12/2005 | Kates | |
| 2005/0288863 A1* | 12/2005 | Workman | 702/14 |
| 2006/0047543 A1 | 3/2006 | Moses | |
| 2006/0052882 A1 | 3/2006 | Kubach et al. | |
| 2006/0056655 A1 | 3/2006 | Wen et al. | |
| 2007/0279214 A1 | 12/2007 | Buehler | |
| 2009/0072968 A1 | 3/2009 | Levesque et al. | |

FOREIGN PATENT DOCUMENTS

WO    WO 2004103163 A2    12/2004

OTHER PUBLICATIONS

D. Li, K. Wong, Y. Hu, A. Sayeed, "Detection, Classification, and Tracking of Targets," IEEE Signal Processing Magazine (Mar. 2002).
M. Duarte, Y. Hu, "Vehicle Classification in Distributed Sensor Networks," Journal of Parallel and Distributed Computing, vol. 64, Issue 7 (Jul. 2004).
G. Succi, D. Clapp, R. Gampert, G. Prado, "Footstep Detection and Tracking," Proceedings of SPIE vol. 4393 (2001).
G. Sleefe, M. Ladd, D. Gallegos, C. Sicking, I. Erteza, "A Novel Algorithm for Real-Time Adaptive Signal Detection and Identification," Proceedings of SPIE vol. 3374 (1998).
A. Pakhomov, A. Sicignano, M. Sandy, T. Goldburt, "Seismic Footstep Signal Characterization," Proceedings of SPIE vol. 5071 (2003).
Office Action in U.S. Appl. No. 11/593,719, dated May 11, 2009.
Office Action in U.S. Appl. No. 11/593,916, dated Jan. 21, 2009.
Office Action in U.S. Appl. No. 11/593,916, dated May 19, 2009.
Office Action in U.S. Appl. No. 11/593,890, dated Jan. 12, 2009.
Office Action in U.S. Appl. No. 11/593,890, dated May 13, 2009.
Office Action in U.S. Appl. No. 11/593,890, dated Aug. 26, 2009.
Office Action in U.S. Appl. No. 11/593,718, dated Jan. 9, 2009.
Office Action in U.S. Appl. No. 11/593,718, dated Apr. 29, 2009.
Office Action in U.S. Appl. No. 11/593,718, dated Aug. 6, 2009.
Office Action in U.S. Appl. No. 11/593,835, dated Jan. 12, 2009.
Office Action in U.S. Appl. No. 11/593,835, dated May 12, 2009.
Office Action in U.S. Appl. No. 11/593,835, dated Aug. 25, 2009.
International Search Report from PCT No. PCT/US2007/083889, dated Nov. 3, 2009.
U.S. Appl. No. 11/593,719, Advisory Action mailed Oct. 13, 2009.
U.S. Appl. No. 11/593,719, Office Action mailed Jan. 5, 2010.
PCT/US2007/083894, International Search Report and Written Opinion mailed Dec. 4, 2008.
PCT/US2007/083896, International Search Report and Written Opinion mailed Jul. 11, 2008.
PCT/US2007/083902 International Search Report and Written Opinion mailed Sep. 12, 2008.
PCT/US2007/083900, International Search Report and Written Opinion mailed Nov. 27, 2008.

* cited by examiner

SYSTEMS AND METHODS FOR DYNAMIC SITUATIONAL SIGNAL PROCESSING FOR TARGET DETECTION AND CLASSIFICATION

BACKGROUND OF THE INVENTION

The present invention generally relates to remote sensor systems. More specifically, the present invention relates to systems and methods for improved data communications and/or improved signal processing within remote sensor systems.

Throughout the world, military and homeland security forces face an increasing need to provide safety and security to troops and high value assets. Remote sensor systems are ideal for surveillance and monitoring of high-value assets, such as troop encampments, airfields, base installations, supply routes, and depots. In larger networks, remote sensor systems are used to monitor and protect national borders, regional boundaries, and assets in homeland defense and peacekeeping operations.

Remote sensor systems typically include a network of easily deployed, remotely located sensors that detect the movement of personnel and vehicles. These sensors are typically remote, battery-operated devices that provide commanders with critical surveillance data on a 24-hour basis.

Existing remote sensor systems include several disadvantages. For example, existing remote sensor systems typically flood the network with raw data to be later interpreted at a control station. Additionally, these systems generate a large number of false alarms due to uneventful detections, such as animal movement near the sensors. As another example, existing remote sensor systems are typically designed for a specific application, yet lack sufficient battery life to last the entire mission.

Thus, there is a need for systems and methods for improved data communications and/or improved signal processing within remote sensor systems.

BRIEF SUMMARY OF THE INVENTION

Certain embodiments of the present invention provide a system for improved signal processing within a remote sensor system. The system includes a detection component and a processing component. The detection component is adapted to detect an event and generate a signal based at least in part on the event. The processing component adapted to process a signal based at least in part on a situation.

Certain embodiments of the present invention provide a method for improved signal processing within a remote sensor system. The method includes determining a situation, detecting an event, generating a signal based at least in part on the event, and processing the signal based at least in part on the situational parameter.

Certain embodiments of the present invention provide a computer readable storage medium. The computer readable storage medium includes a set of instructions for execution on a computer. The set of instructions includes a detection routine and a processing routine. The detection routine is configured to detect an event and generate a signal based at least in part on the event. The processing routine is configured to process the signal based at least in part on a situation.

Figure 1:
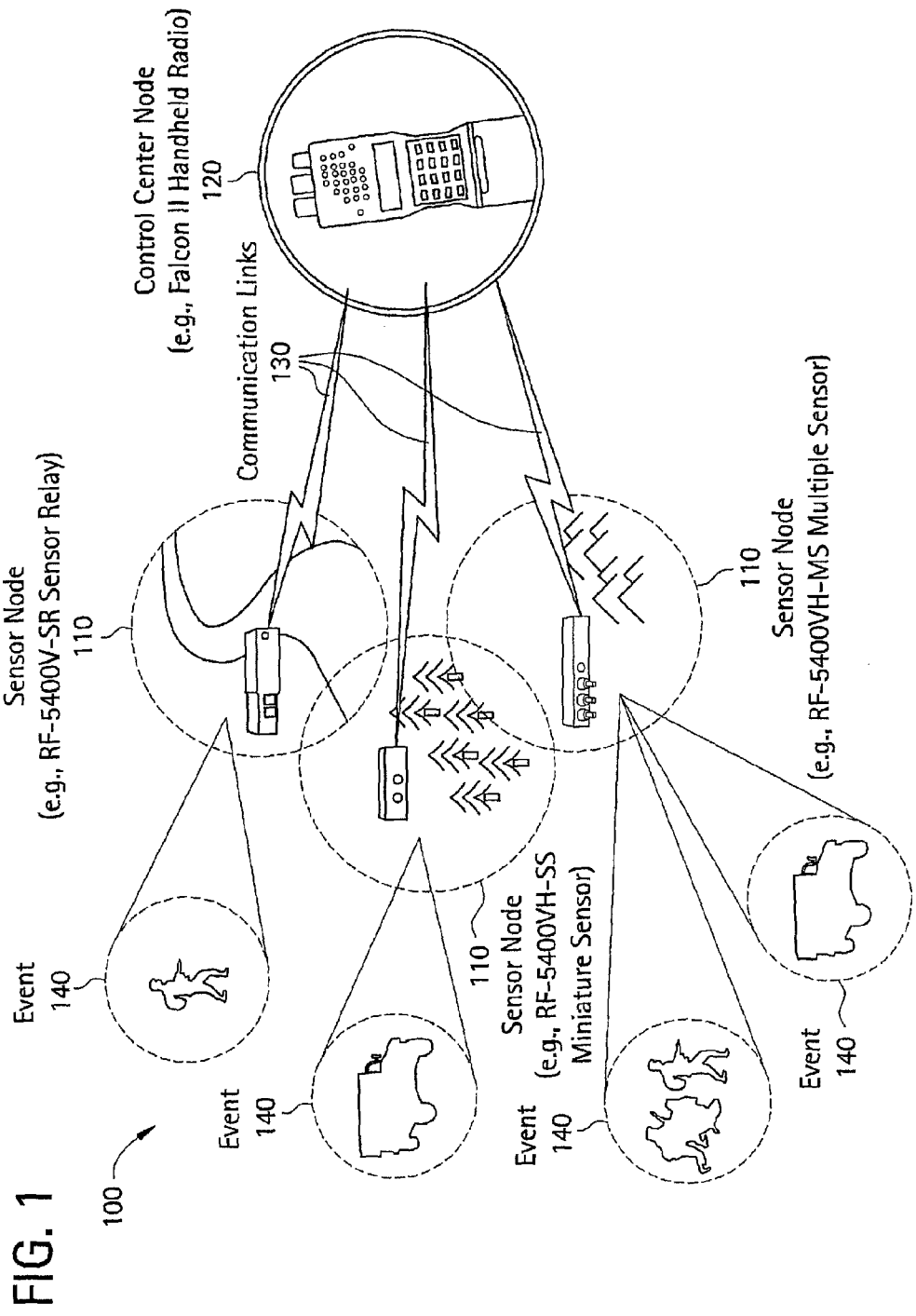
FIG. 1 illustrates an exemplary remote sensor system 100 operating in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an exemplary remote sensor system 100 operating in accordance with an embodiment of the present invention. For example, the system 100 may include a RF-5400 sensor system (Harris Corporation, Rochester, N.Y.). The system 100 includes one or more sensor nodes 110, a control center node 120, and one or more communication links 130. In operation, one or more events 140, such as vehicles and personnel, may be detected by sensor nodes 110. For example, sensor node 110 may include a RF-5400VH-SS miniature sensor, a RF-5400VH-MS multiple sensor, and a RF-5400V-SR sensor/relay, as shown in FIG. 1. The events 140 may be communicated to control center node 120, for example, via radio frequency communication links 130. The control center node 120 may include, for example, a Falcon II handheld radio, also shown in FIG. 1. Alternatively and/or in addition, one or more commands (e.g., a command set) may be may be communicated, for example, from the control center node 120 to the sensor node 110, to provide "on the fly" re-configuration the system 100.

Figure 2:
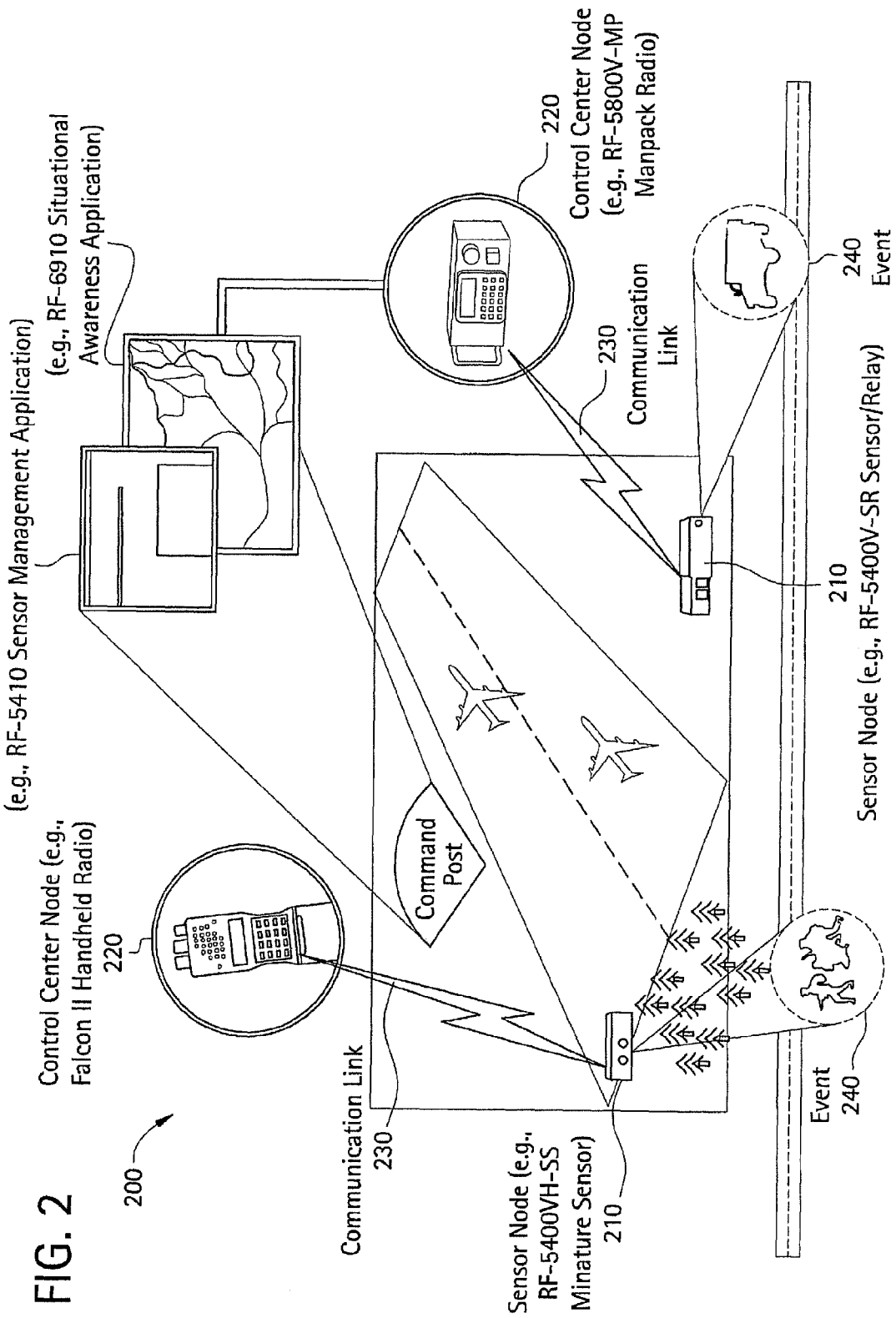
FIG. 2 illustrates an exemplary remote sensor system 200 operating in accordance with an embodiment of the present invention.

FIG. 2 illustrates an exemplary remote sensor system 200 operating in accordance with an embodiment of the present invention. For example, the system 200 may include a RF-5400 sensor system (Harris Corporation, Rochester, N.Y.). The system 200 includes a plurality of sensor nodes 210, a plurality of control center nodes 220, and a plurality of communication links 230. In operation, one or more events 240, such as vehicles and personnel, may be detected by sensor nodes 210. For example, sensor nodes 210 may include a RF-5400VH-SS miniature sensor and an RF-5400V-SR sensor/relay, as shown in FIG. 2. The events 240 may be communicated to control center nodes 220, for example, via radio frequency communication links 230. The control center nodes 220 may include, for example, a Falcon II handheld radio, a RF-5800V-MP manpack radio, a RF-5410 sensor management application, and a RF-6910 situational awareness application, also shown in FIG. 2. Alternatively and/or in addition, one or more commands (e.g., a command set) may be may be communicated, for example, from the control center nodes 220 to the sensor nodes 210, to provide "on the fly" re-configuration the system 200.

Figure 3:
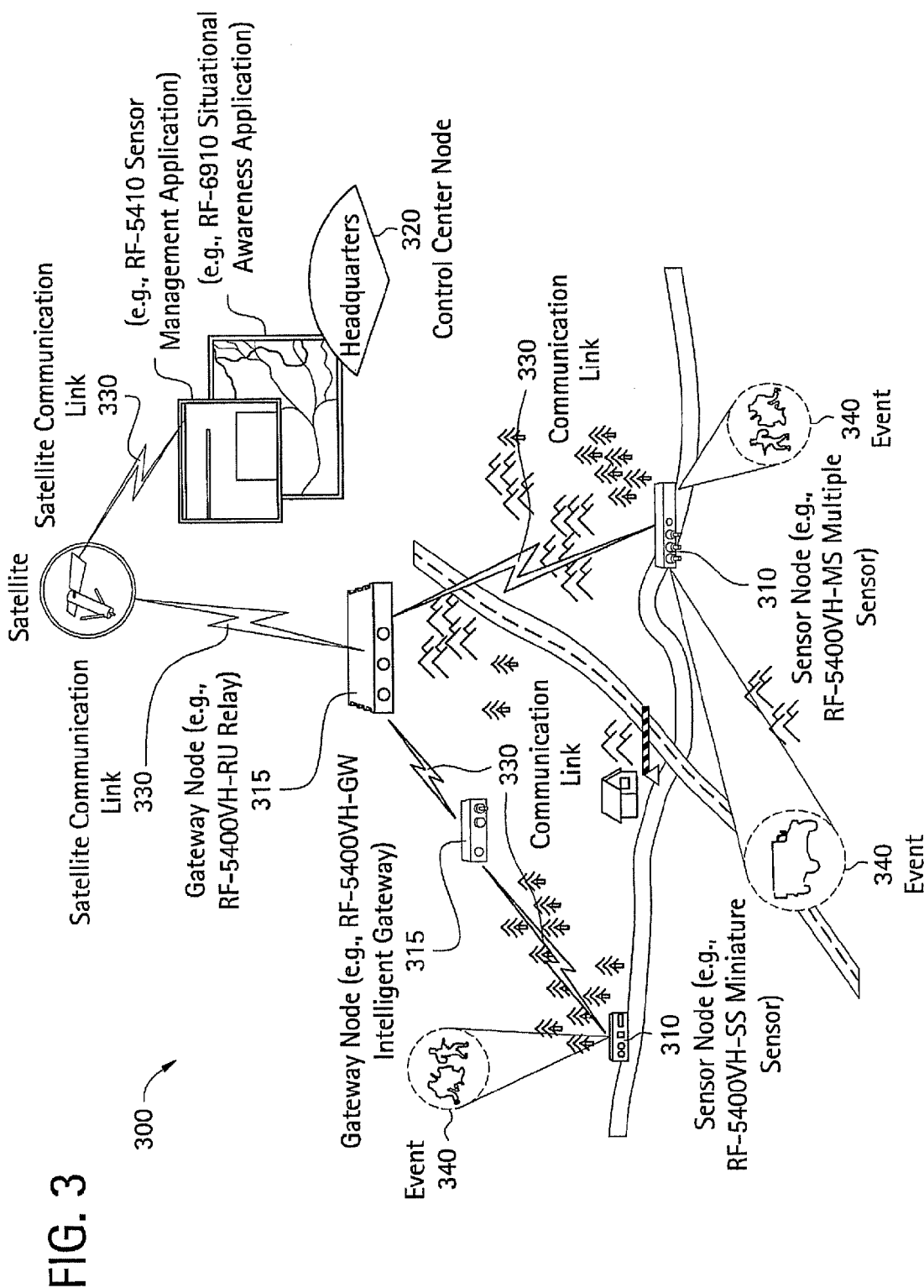
FIG. 3 illustrates an exemplary remote sensor system 300 operating in accordance with an embodiment of the present invention.

FIG. 3 illustrates an exemplary remote sensor system 300 operating in accordance with an embodiment of the present invention. For example, the system 300 may include a RF-5400 sensor system (Harris Corporation, Rochester, N.Y.). The system 300 includes a plurality of sensor nodes 310, a plurality of gateway nodes 315, a control center node 320, and a plurality of communication links 330. In operation, one or more events 340, such as vehicles and personnel, may be detected by sensor nodes 310. For example, sensor nodes 310 may include a RF-5400VH-SS miniature sensor and a RF-5400VH-MS multiple sensor, as shown in FIG. 3. The events 340 may be communicated to gateway nodes 315, for example, via radio frequency communication links 330. The gateway nodes 315 may include, for example, a RF-5400VH-RU relay and a RF-5400VH-GW intelligent gateway, also shown in FIG. 3. The events 340 may be communicated to control center node 320, for example, via satellite communication links 330. The control center node 320 may include, for example, a RF-5410 sensor management application and a RF-6910 situational awareness application, also shown in FIG. 3. Alternatively and/or in addition, one or more commands (e.g., a command set) may be may be communicated, for example, from the control center node 320 to the gateway nodes 315 and/or the sensor nodes 310, to provide "on the fly" re-configuration the system 300.

Figure 4:
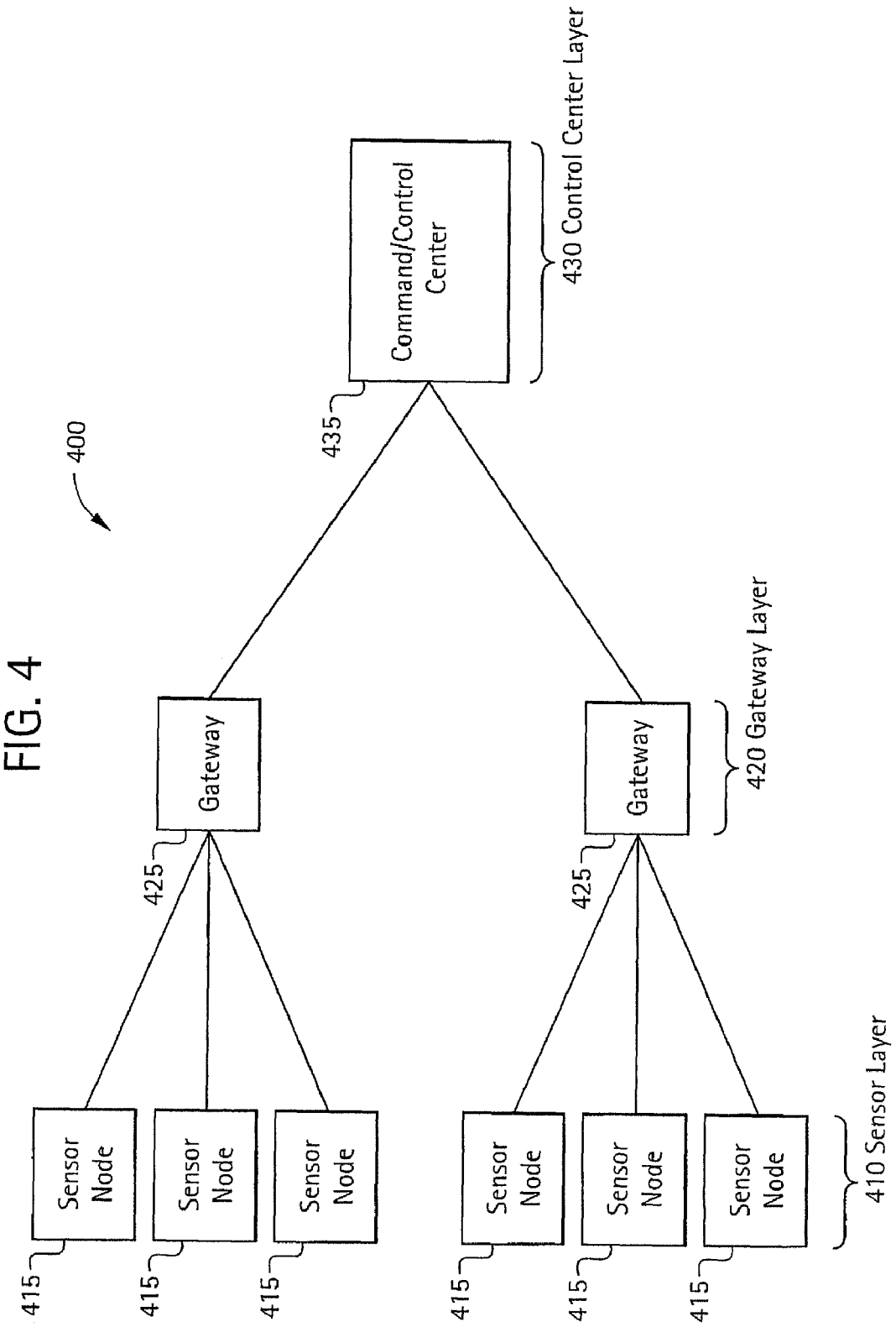
FIG. 4 illustrates a system 400 for improved data communications within a remote sensor system according to an embodiment of the present invention.

FIG. 4 illustrates a system 400 for improved data communications within a remote sensor system according to an embodiment of the present invention. For example, the system 400 may include a RF-5400 sensor system (Harris Corporation, Rochester, N.Y.). The system 400 includes a sensor layer 410, a gateway layer 420, and control center layer 430, which are described in more detail below.

The sensor layer 410 may include one or more sensor nodes 415. For example, the sensor nodes 415 may include sensors, such as RF-5400VH-SS miniature sensors, RF-5400VH-MS multiple sensors, and/or RF-5400V-SR sensors/relays. The sensor nodes 415 may also include, for example, detectors, such as seismic, acoustic, magnetic, and/or passive infra-red (PIR) detectors.

The gateway layer 420 may include one or more gateway nodes 425. For example, the gateway nodes 425 may include range extenders, such as RF-5400VH-RU relays, RF-5400V-SR sensor/relays, and/or RF-5400VH-GW intelligent gateways.

The control center layer 430 may include one or more control center nodes 435. For example, the control center node 435 may include monitors, such as Falcon II handheld radios, RF-5800V-MP manpack radios, RF-5410 sensor management applications, and/or RF-6910 situational awareness applications.

The sensor layer 410 is in communication with the gateway layer 420 and/or the control center layer 430. For example, as shown in FIG. 4, a plurality of sensor nodes 415 may communicate directly with a gateway node 425 and indirectly with a control center node 435. As another example, the plurality of sensor nodes 415 may communicate directly with the control center node 435.

The gateway layer 420 is in communication with the sensor layer 410 and/or the control center layer 430. For example, as shown in FIG. 4, a gateway node 425 may communicate with a plurality of sensor nodes 415 and a plurality of gateway nodes 425 may communicate with a control center node 435.

The control center layer 430 is in communication with the sensor layer 410 and/or the gateway layer 420. For example, as shown in FIG. 4, a control center node 435 may communicate directly with a plurality of gateway nodes 425 and indirectly with a plurality of sensor nodes 415.

The sensor layer 410 is adapted to detect one or more events. For example, a seismic detector in sensor node 415 may be adapted to detect movement of personnel. As another example, a passive infra-red (PIR) detector in sensor node 410 may be adapted to detect left to right movement of vehicles.

The sensor layer 410 is adapted to generate data based at least in part on one or more events. The data may include, for example, data, signals, events, and/or reports. The data may be stored, for example, in a database. The database may be indexed, for example, based at least in part on network identification (network ID), cluster area, time, classification, direction, global positioning satellite location (GPS location), and/or detection type.

The sensor layer 410 is adapted to process and/or communicate data based at least in part on one or more rules and/or algorithms (e.g., a rule or algorithm set). For example, a plurality of sensor nodes 415 may be adapted to transmit data to a gateway node 425 and/or a control center node 435 based at least in part on a sensor transmission rule. The rule set may include, for example, ordered/unordered events, direction specific events, and/or classification specific events. The rule set may be configured "on the fly", for example, by the system 400 and/or a user of the system 400. The rule set may be configured remotely, for example, from any node in the system 400.

Figure 5:
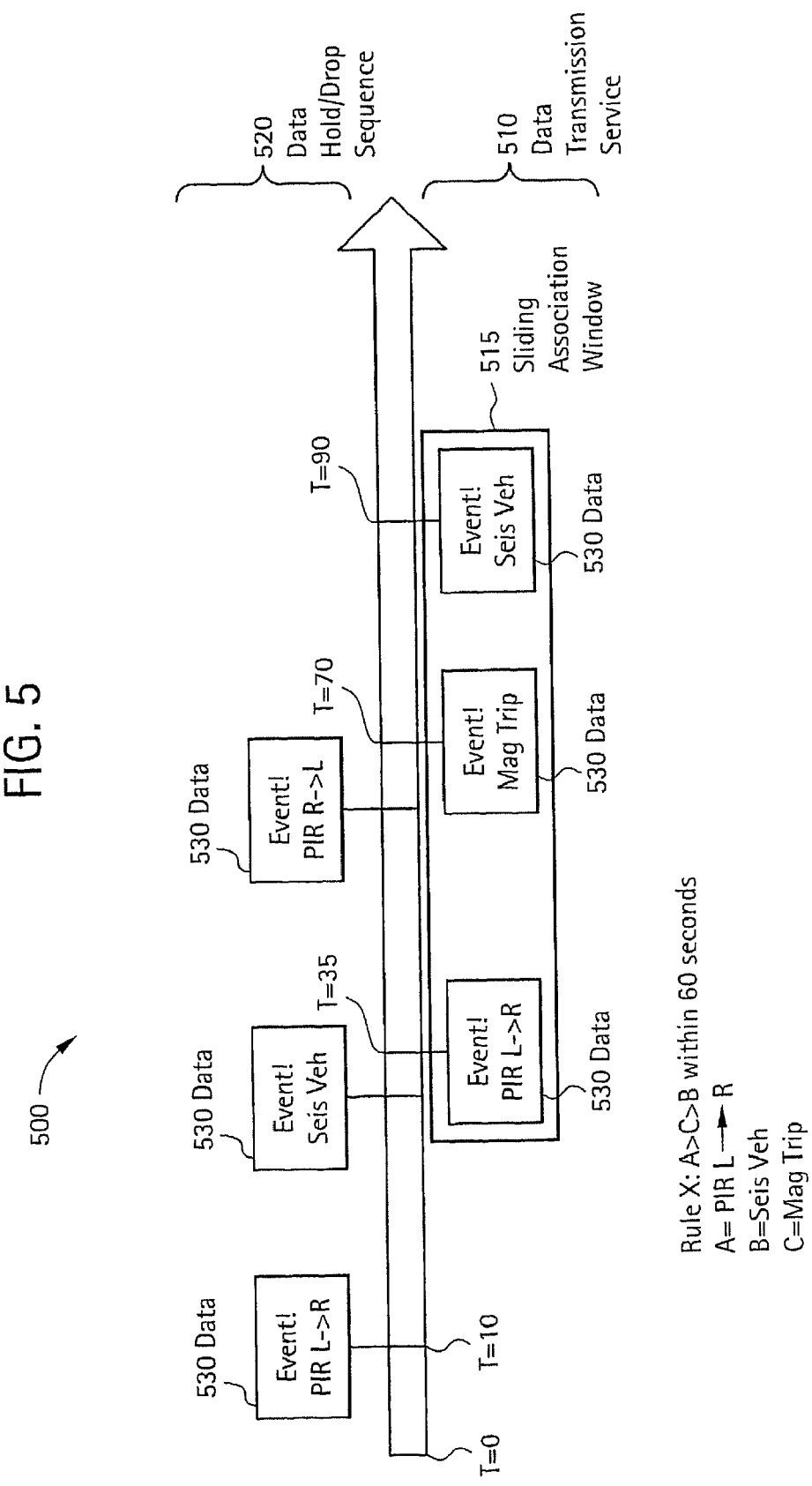
FIG. 5 illustrates an example 500 of a sensor transmission rule operating in accordance with an embodiment of the present invention.

FIG. 5 illustrates an example 500 of a sensor transmission rule operating in accordance with an embodiment of the present invention. The example 500 includes a data transmission sequence 510 and a data hold/drop sequence 520. The data transmission sequence 510 includes a sliding association window 515. The example 500 also includes data 530, which may include, for example, data, signals, events, and/or reports. The example 500 is described with reference to the system 400 of FIG. 4, but it should be understood that other implementations are possible.

In operation, the data 530 is compared to the sensor transmission rule. If the rule is satisfied, then the data 530 may be communicated. Alternatively and/or in addition, a single event corresponding to the rule may be transmitted to reduce the amount of data transmitted and still indicate that the rule has been satisfied. Conversely, if the rule is not satisfied, then the data 530 may be held and/or dropped.

For example, RULE X may be configured by a user to be a combination of EVENT A, EVENT B, and EVENT C in the order of A>C>B within 60 seconds, where EVENT A includes passive infra-red (PIR) detection of a relative left to right moving target, EVENT B includes seismic detection of any classification, and EVENT C includes magnetic "tripwire" detection. The data 530 in the sliding association window 515 of the data transmission sequence 510 satisfies RULE X, and consequently, may be transmitted, for example, from a sensor node 415 to a gateway node 425 and/or a control center node 435. Alternatively and/or in addition, a single event corresponding to RULE X may be transmitted to reduce the amount of data transmitted and still indicate that RULE X has been satisfied. Conversely, the data 530 in the data hold/drop sequence 520 does not satisfy RULE X, and consequently, may be held and/or dropped.

Although the data transmission sequence 510 is described with reference to a single sliding association rule 515, it should be understood that one or more sliding association windows 515 are possible. For example, if a second start condition is present, such as EVENT A, then a second sliding association window 515 may be started. If EVENT C and then EVENT B follow within 60 seconds of EVENT A, then RULE X is satisfied and the data 530 in the second sliding association window 515 may be transmitted, for example, from the sensor node 415 of FIG. 4 to a gateway node 425 and/or a control center node 435. Conversely, if EVENT C and then EVENT B do not follow within 60 seconds of EVENT A, then RULE X is not satisfied, the second sliding window 515 may be closed, and the data 530 in the second sliding association window 515 may be held and/or dropped.

The gateway layer 420 is adapted to process and/or communicate data based at least in part on one or more rules and/or algorithms (e.g., a rule or algorithm set). For example, a gateway node 425 may be adapted to receive data from one or more sensor nodes 415 and transmit the data to a control center node 435 based at least in part on a gateway transmission rule. The rule set may include, for example, ordered/unordered events, node identification (node ID) based events, and/or report type based events. The rule set may be configured "on the fly", for example, by the system 400 and/or a user of the system 400. The rule set may be configured remotely, for example, from any node in the system 400.

Figure 6:
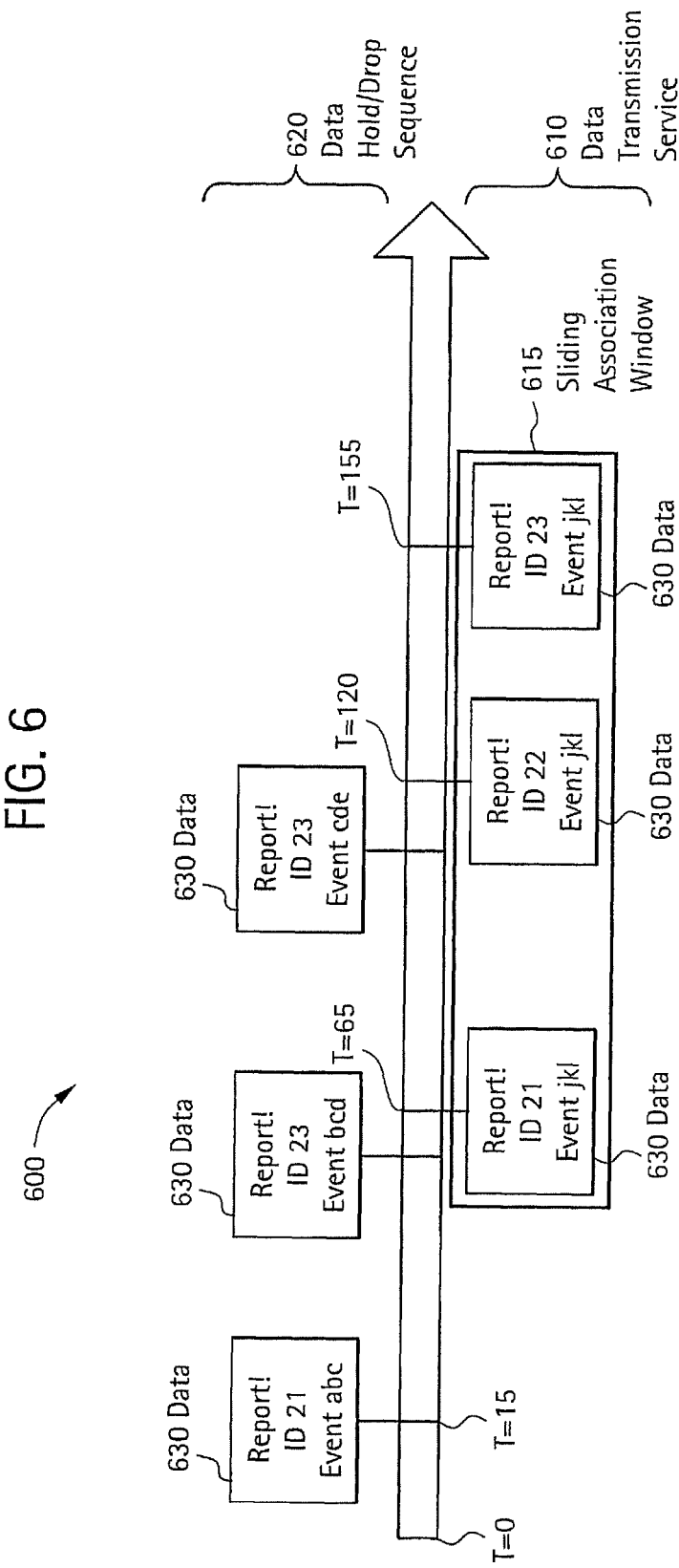
FIG. 6 illustrates an example 600 of a gateway transmission rule operating in accordance with an embodiment of the present invention.

FIG. 6 illustrates an example 600 of a gateway layer rule operating in accordance with an embodiment of the present invention. The example 600 includes a data transmission sequence 610 and a data hold/drop sequence 620. The data transmission sequence 610 includes a sliding association window 615. The example 600 also includes data 630, which may include, for example, data, signals, events, and/or reports.

In operation, the data 630 is compared to the sensor layer rule. If the rule is satisfied, then the data 630 may be transmitted. Alternatively and/or in addition, a single event corresponding to the rule may be transmitted to reduce the amount of data transmitted and still indicate that the rule has been satisfied. Conversely, if the rule is not satisfied, then the data 630 may be held and/or dropped.

For example, RULE Y may be configured by a user to include a combination of SENSOR NODE 21, SENSOR NODE 22, and SENSOR NODE 23, each sensor node reporting identical events in the order 21>22>23 within 180 seconds. The data 630 in the sliding association window 615 of the data transmission sequence 610 satisfies RULE Y, and consequently, may be transmitted, for example, from a gateway node 425 to a control center node 435. Alternatively, a single event corresponding to RULE Y may be transmitted to reduce the amount of data transmitted and still indicate that RULE Y has been satisfied. Conversely, the data 630 in the data hold/drop sequence 620 does not satisfy RULE Y, and consequently, may be held and/or dropped.

Although the data transmission sequence 610 is described with reference to a single sliding association rule 615, it should be understood that one or more sliding association windows 615 are possible. For example, if a second start condition is present, such as SENSOR NODE 21 reporting an event, then a second sliding association window 615 may be started. If SENSOR NODE 22 and then SENSOR NODE 23 report the same event within 180 seconds, then RULE Y is satisfied, and consequently, the data 630 in the second sliding association window 615 may be transmitted, for example, from a gateway node 425 to a control center node 435. Conversely, if SENSOR NODE 22 and then SENSOR NODE 23 do not report the same event within 180 seconds, then RULE Y is not satisfied, the second sliding association window 615 may be closed, and the data 630 in the second sliding association widow 615 may be held and/or dropped.

The control center layer 430 is adapted to notify a user based at least in part on one or more rules and/or algorithms (e.g., a rule or algorithm set). For example, a control center node 435 may receive data from a plurality of sensor nodes 415 and/or a plurality of gateway nodes 425 and automatically alert a user when the data matches a pattern recognition template. The rule set may include, for example, ordered/unordered events and/or analog/digital signatures. The rule set may be implemented using a sliding association window, as described above. The rule set may be configured "on the fly", for example, by the system 400 and/or a user of the system 400. The rule set may be configured remotely, for example, from any node in the system 400.

For example, a user may create a pattern recognition template that matches on relative left to right movement of a vehicle reported first from SENSOR NODE A and then from SENSOR NODE B within 5 minutes. The control center layer 430 may query a database and alert the user when the data in the database matches the pattern recognition template.

The rule set may be run continuously or periodically (e.g., daily, hourly, etc.) depending on the particular application of the system 400, such as force protection, perimeter surveillance, and/or remote boarder monitoring.

As discussed above, the components, elements, and/or functionality of the system 400 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Figure 7:
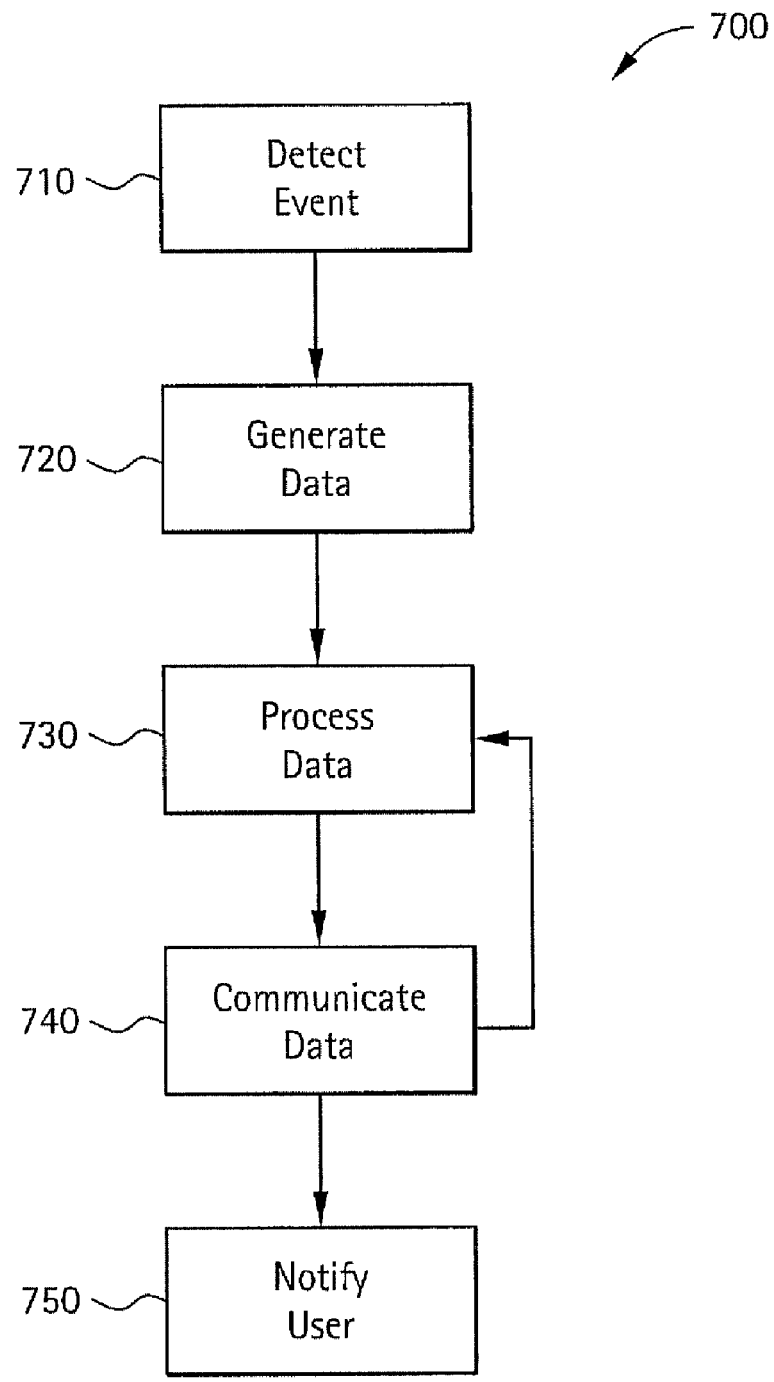
FIG. 7 illustrates a method 700 for improved data communications within a remote sensor system according to an embodiment of the present invention.

FIG. 7 illustrates a method 700 for improved data communications within a remote sensor system according to an embodiment of the present invention. The method 700 includes the following steps, which are described in more detail below. At step 710, an event is detected. At step 720, data is generated. At step 730, the data is processed. At step 740, the data is communicated. At step 750, a user is notified. The method 700 is described with reference to the components of the system 400 of FIG. 4, but it should be understood that other implementations are possible.

At step 710, an event is detected, for example, by a sensor node, such as sensor node 415. The event may include, for example, left to right vehicle movement detected by a passive infra-red (PIR) detector.

At step 720, data is generated based at least in part on the event. For example, the left to right vehicle movement detected by the passive infra-red (PIR) detector may be reported in a database.

At step 730, the data is processed based at least in part on a rule. For example, if the rule is satisfied (e.g., the data matches the rule), then the data may be transmitted. Conversely, for example, if the rule is not satisfied (e.g., the data does not match the rule), then the data may be held and/or dropped. The rule may include, for example, a sensor transmission rule, a gateway transmission rule, and/or a control center notification rule.

At step 740, the data is communicated. For example, the data may be transmitted by the sensor node and received by a gateway node, such as gateway node 425, and/or a control center node, such as control center node 435. As another example, the data may be transmitted by the gateway node and received by the control center node.

In certain embodiments of the present invention, the data may be communicated when the rule is satisfied. For example, the data may be transmitted from the sensor node to the gateway node and/or the control center node when a sensor transmission rule is satisfied. As another example, the data may be transmitted from the gateway node to the control center node when a gateway rule is satisfied.

At step 750, a user is notified when the control center notification rule is satisfied. For example, a user may be automatically alerted when data in a database matches a pattern recognition template.

One or more of the steps 710-750 of the method 700 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

820, and analysis component 830, a classification component 840, and a communication component 850. The system 800 is described with reference to the components of the sensor system 400 of FIG. 4, but it should be understood that other implementations are possible.

The detection component 810 is adapted to detect one or more events, such as movement of personnel and/or vehicles. The detection component 810 may include detectors, such as seismic, acoustic, magnetic, and/or passive infra-red (PIR) detectors. For example, a seismic detector in a sensor node, such as sensor node 415 of FIG. 4, may communicate a signal that can be later interpreted to be personnel and/or vehicles. As another example, a passive infra-red (PIR) detector in a sensor node, such as sensor node 415 of FIG. 4, may communicate a signal that can be later interpreted to be directional and/or tripline.

The detection component 810 is adapted to generate a signal based at least in part on the event. For example, a seismic detector may detect seismic vibrations and generate a corresponding electrical signal. As another example, a passive infra-red (PIR) detector may detect infra-red energy and generate a corresponding electrical signal.

The processing component 820 is adapted to process a signal. For example, the processing component 820 may be adapted to process the signal generated by the detection component 810.

Figure 9:
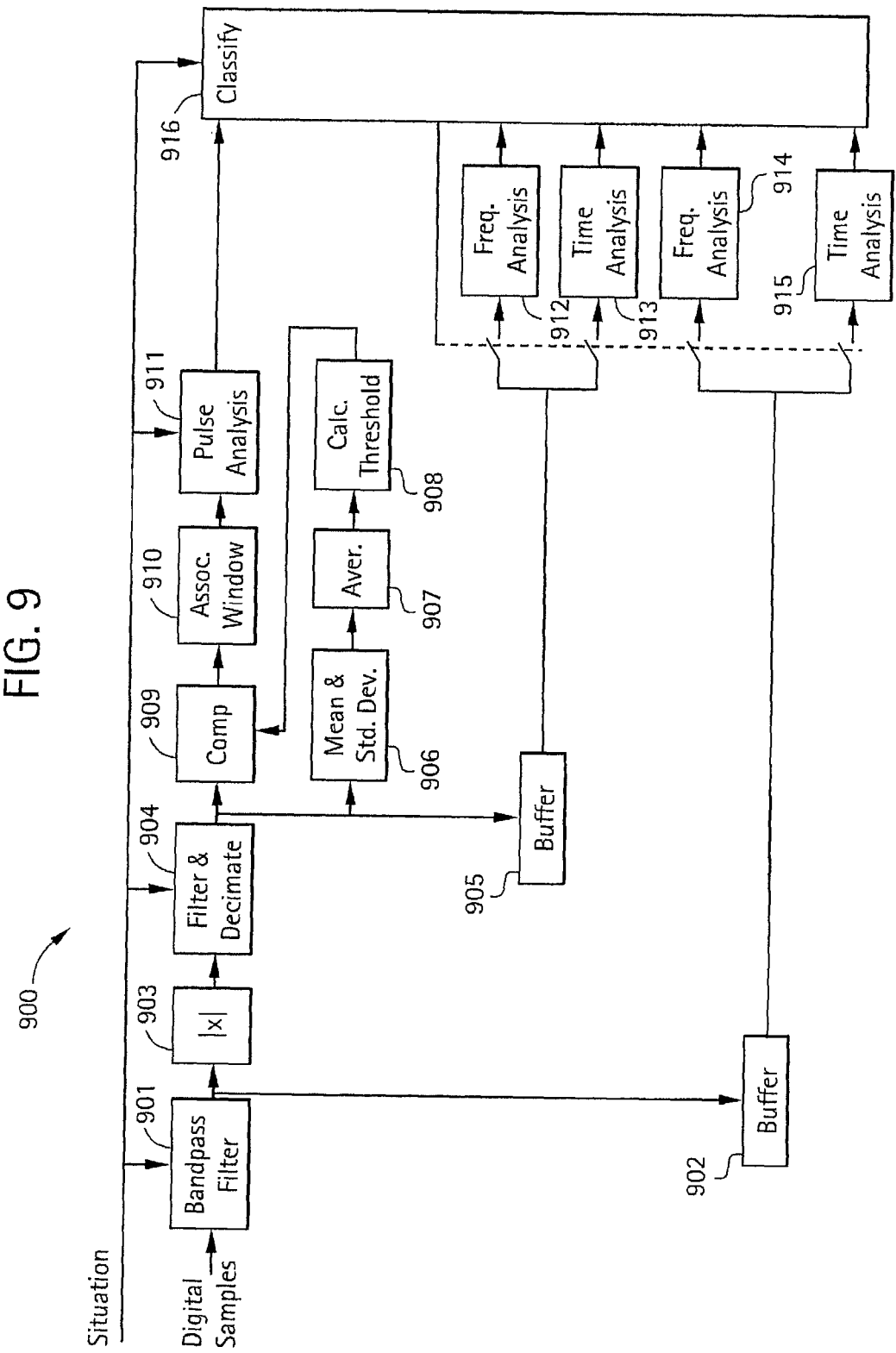
FIG. 9 illustrates an exemplary signal processing system 900 operating in accordance with an embodiment of the present invention.

In certain embodiments of the present invention, the processing component 820 may be adapted to process the signal based at least in part on a situation. FIG. 9 illustrates an exemplary signal processing system 900 operating in accordance with an embodiment of the present invention. As shown in FIG. 9, for example, the signal may be processed by a bandpass filter component 901 and/or stored in a signal buffer 902 based at least in part on the situation. That is, processing parameters, such as filter bandwidth, may be determined based at least in part on the situation. Table 1, as provided below, includes several examples of situations and corresponding processing parameters.

TABLE 1

Examples of Situations and Corresponding Parameters

| Situation | Processing/Analysis Parameters | Classification Parameters |
|---|---|---|
| Environment: Rain | Filter taps<br>Detection Threshold | N/A |
| Environment: Smooth road<br>Target: Pedestrian and Vehicle | Filter taps<br>Detection Threshold<br>Detection Pulse length<br>Detection Pulse spacing | Envelope frequency<br>veh freq mask A<br>Ped gait frequency test<br>Time series of envelope<br>Input Freq<br>veh freq mask B |
| Target: Pedestrian | Filter taps<br>Detection Threshold<br>Detection Pulse length<br>Detection Pulse spacing | Envelope frequency<br>Ped gait frequency test<br>Time series of envelope<br>Kurtosis |
| Environment: Rough road<br>Target: vehicle | Filter taps<br>Detection Threshold<br>Detection Pulse length | Envelope frequency<br>veh freq mask C<br>Input Freq<br>veh freq mask D |

Figure 8:
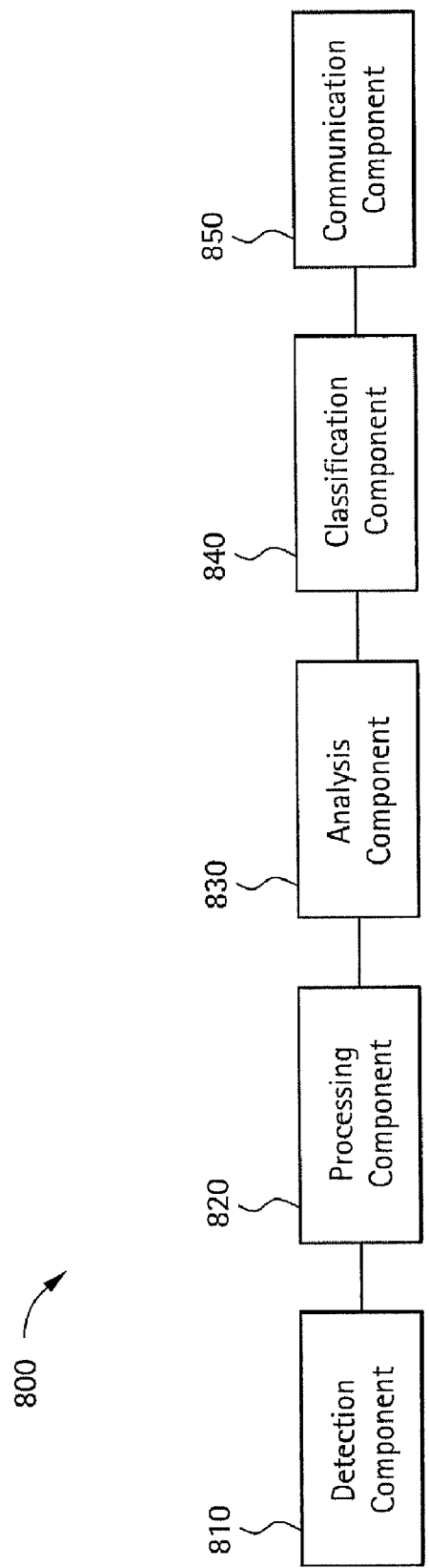
FIG. 8 illustrates a system 800 for improved signal processing within a remote sensor system according to an embodiment of the present invention.

FIG. 8 illustrates a signal processing system 800 according to an embodiment of the present invention. For example, the system 800 may be implemented as part of a sensor system, such as the sensor system 400 of FIG. 4. The system 800 includes a detection component 810, a processing component The situation may include, for example, a target type, such as an aircraft, a vehicle, a pedestrian, and/or an animal. As another example, the situation may include an environment or an environmental condition, such as a surface (e.g., smooth, rough, dirt, gravel, paved, loose, packed, etc.) and/or a surrounding area (e.g., plains, forests, hills, mountains, etc.). As another example, the situation may include a dynamic environment or a dynamic environmental condition, such as a weather condition (e.g., rain, snow, wind, etc.) and/or a military activity (e.g., heavy artillery fire, bombardment, etc.).

In certain embodiments of the present invention, the situation may be determined, for example, by a user. For example, a user may input a situation using an input device, such as a keyboard, a mouse, and/or a touchscreen. As another example, a user may select a situation from a plurality of available situations, for example, by selecting the situation from a drop- or pull-down menu using a mouse and/or selecting a checkbox associated with the situation on a touchscreen. Alternatively and/or in addition, the situation may be determined automatically, for example, by the system 800.

Thus, certain embodiments of the present invention provide systems and methods for adaptive and/or dynamic signal processing. That is, a signal may be processed, for example, based at least in part on a situation, as described above. An example of adaptive signal processing is provided below.

Example

Adaptive Signal Processing

Situation: Searching for vehicles
Environment: Paved road through a wooded area
Dynamic Environmental Condition: Rain When the rain begins, seismic detectors receive large interfering impulses. The system 800 detects the environmental change and adapts the input bandpass filter to notch out those components, resulting in a "cleaner" signal (e.g., better signal to noise and interference ratio), and in turn, improved detection and classification probability. When the rain stops, the adaptive front-end filter returns to the normal frequency response.

In certain embodiments of the present invention, the processing component 830 may be adapted to determine the signal envelope based at least in part on the situation. For example, as shown in FIG. 9, the signal envelope may be determined by a magnitude component 903 and a filter and decimate component 904 and stored in a signal envelope buffer component 905 based at least in part on the situation. That is, processing parameters, such as filter bandwidth, may be determined based at least in part on the situation. Table 1, as provided above, includes several examples of situations and corresponding processing parameters.

In certain embodiments of the present invention, the processing component 820 may be adapted to process and/or analyze the signal envelope based at least in part on the situation. For example, as shown in FIG. 9, the signal envelope may be processed by the mean and standard deviation component 906, the average component 906, the calculation threshold component 908, the comparison component 909, and the association window component 910 based at least in part on the situation. That is, processing/analysis parameters, such as detection threshold, detection pulse length, detection pulse spacing, detection time window length, number of pulses in the detection time window, association window length, and/or association window N of M threshold, may be determined based at least in part on the situation. Table 1, as provided above, includes several examples of situations and corresponding processing/analysis parameters.

The analysis component 830 is adapted to analyze a signal. For example, the analysis component 830 may be adapted to analyze the signal generated by the detection component 810. As another example, the analysis component 830 may be adapted to analyze the signal processed by the processing component 820.

In certain embodiments of the present invention, the analysis component 820 may be adapted to analyze the signal, for example, in one or more domains. For example, as shown in FIG. 9, the signal stored in the signal buffer 902 may be analyzed in the frequency domain (e.g., ordered ranking of peaks, frequency sub-band sums, desired fundamental and harmonic association filters) by the frequency analysis component 914. As another example, the signal may be analyzed in the time domain (e.g., kurtosis, cadence analysis) by the time analysis component 915.

In certain embodiments of the present invention, the analysis component 830 may be adapted to analyze the signal envelope, for example, in one or more domains. For example, as shown in FIG. 9, the signal envelope stored in the signal envelope buffer 905 may be analyzed in the frequency domain (e.g., ordered ranking of peaks, frequency sub-band sums, desired fundamental and harmonic association filters) by the frequency analysis component 912. As another example, the signal envelope may be analyzed in the time domain (e.g., kurtosis, cadence analysis) by the time analysis component 913.

In certain embodiments of the present invention, the analysis component 830 may be adapted to process and/or analyze the signal envelope based at least in part on the situation. For example, as shown in FIG. 9, the signal envelope may be analyzed by the pulse analysis component 911 based at least in part on the situation. That is, processing/analysis parameters, such as detection threshold, detection pulse length, detection pulse spacing, detection time window length, number of pulses in the detection time window, association window length, and/or association window N of M threshold, may be based at least in part on the situation. Table 1, as provided above, includes several examples of situations and corresponding processing/analysis parameters.

Thus, certain embodiments of the present invention provide systems and methods for envelope signal processing. That is, the envelope of a signal may be processed and/or analyzed, for example, based at least in part on the situation, as described above. An example of envelope signal processing is provided below.

Example

Envelope Signal Processing

For a seismic signal, the comparison between the low frequency components and the rest of the frequency components of the envelope can be used as a feature to help determine the difference between impulse sources such as a person or animal and constant sources such as a vehicle. Using the envelope of the signal allows for lower sampling rates than processing the original signal. This in turn reduces memory, processor loading, and power requirements. These comparisons include but are not limited to ratio between the low frequency components and the rest of the frequency components, the power in the low frequency components and the total signal power, and/or the difference between select groups of frequency components.

The classification component 840 is adapted to classify an event. For example, the event may be classified as a pedestrian, a vehicle, a light vehicle, a heavy vehicle, a wheeled vehicle, a tracked vehicle, and/or another appropriate classification. The classification may include data, signals, events, and/or reports.

In certain embodiments of the present invention, the classification component 840 may be adapted to classify the event based at least in part on a situation. For example, as shown in FIG. 9, a classification component 916 may be adapted to actuate one or more switches 917 based at least in part on the situation. That is, classification parameters, such as feature selection and/or feature execution order, may be based at least in part on the situation. Table 1, as provided above, includes several examples of situations and corresponding classification parameters.

Thus, certain embodiments of the present invention provide systems and methods for multi-domain signal processing. That is, a signal and/or a signal envelope may be analyzed, for example, in more than one domain. An example of multi-domain signal processing is provided below.

Example

Multi-Domain Signal Processing

Use of features from different domains to classify a target
Situation: Searching for pedestrian and vehicles
Environment: Packed soil
Features used:
Domain: Frequency spectrum of the envelope
Feature: Existence of a peak at the gait rate of a person's walk and the first harmonic.
Reason: This feature will detect the presence of impulses that occur at the rate of a person's feet impact with the ground.
Domain: time series of the envelope
Feature: Kurtosis
Reason: This feature measures the "peakedness" of the probability distribution. This measurement will be different for a vehicle verses a pedestrian.
Domain: Frequency domain of the input digital samples
Feature: High frequency band power
Reason: This feature measures the presence of a frequency source that is typically higher then the resonant frequency provide from the impact of a person's step.

By themselves these features are not reliable enough to accurately predict the presence of a person verses a vehicle. However, when the expected results of these features are combined, a better estimate of the target is achieved. By using features from different domains, the interdependency between the features measured is much smaller then using all features from the same domain.

Additionally and/or alternatively, certain embodiments of the present invention provide systems and methods for power efficient signal processing. That is, a signal and/or a signal envelope may be processed, analyzed, and/or classified based at least in part on a limited set of features. An example of power efficient signal processing is provided below.

Example

Power Efficient Signal Processing

Not using all the features all the time.
Situation: Searching for pedestrian
Environment: Packed soil
Features used:
Domain: Frequency spectrum of the envelope
Feature: Existence of a peak at the gait rate of a person's walk and the first harmonic.
Reason: This feature will detect the presence of impulses that occur at the rate of a person's feet impact with the ground.
Domain: time series of the envelope
Feature: Kurtosis
Reason: This feature measures the "peakedness" of the probability distribution. This measurement will be different for background noise and other man made sources verses a pedestrian walking.

When searching for a pedestrian against background noise, only the gait of the footstep and the Kurtosis need to be used. If the gait rate is found along with a harmonic to that rate, there is a high confidence that it is a person that is walking past the sensor. A detection of a pedestrian is declared. If the values for the gait fundamental and harmonic are not sufficient for a confident decision, the Kurtosis is calculated. If the value of the Kurtosis combined with the gait frequency is sufficient, a pedestrian is declared. Otherwise it is assumed that the source was not a person.

Based on the confidence level of the classification from one or multiple of the features, the signal processing can either continue evaluating features or stop and report the classification. This reduces the processing requirements as well as the overall average system classification delay for resource limited remote sensors.

Additionally and/or alternatively, certain embodiments of the present invention provide systems and methods for multi-observation signal processing. That is, more than one signal may be processed, analyzed, and/or classified, as described above. An example of multi-observation signal processing is provided below.

Example

Multi-Observation Signal Processing

Using multiple observations of the same features to classify a target.
Situation: Searching for pedestrian and vehicles
Environment: Packed soil
Features used:
Domain: Frequency spectrum of the envelope
Feature: Existence of a peak at the gait rate of a person's walk and the first harmonic.
Reason: This feature will detect the presence of impulses that occur at the rate of a person's feet impact with the ground.
Domain: time series of the envelope
Feature: Kurtosis
Reason: This feature measures the "peakedness" of the probability distribution. This measurement will be different for a vehicle verses a pedestrian.
Domain: Frequency domain of the input digital samples
Feature: High frequency band power
Reason: This feature measures the presence of a frequency source that is typically higher then the resonant frequency provide from the impact of a person's step.

The classification results of the features calculated and a probability of a pedestrian and vehicle are estimated. If the probability of either the pedestrian or the vehicle is not sufficient to make a decision, the same features are calculated again after a given delay in time. These probabilities are combined with the first observation time instance. This is repeated until either, the signal goes away or the probability threshold (or simple voting) of a pedestrian or vehicle is exceed.

The system performs a classification decisions based on but not limited to one feature set or a multiple of feature sets. The decision can be a hard decision for one of the possible classification hypotheses or a soft decision where a weight or probability is assigned to each possible decision hypothesis. The classification decision hypotheses are given a weight value. This weight value can be but not limited to a measure of the signal to noise ratio, confidence level, signal energy, or a simple value of one or zero. Over multiple observation periods, the weighted classification decisions are combined for the possible decision hypotheses. The combination of weighted decision values over different observation windows can be for a fixed duration of observation windows, until a difference threshold between classification hypotheses is achieved, or until the target exits the sensor range limits.

The communication component 850 is adapted to communicate a classification. For example, the communication component 850 may be adapted to transmit a classification data and/or a classification report from a sensor node, such as sensor node 415 of FIG. 4, to a gateway node, such as gateway node 425 of FIG. 4, and/or a control center node, such as control center node 435 of FIG. 4.

In certain embodiments of the present invention, the communication component 850 may be adapted to communicate with and/or facilitate communications between the other components 810-840 of the system 800. For example, the detection component 810 may communicate directly with the processing component 820. As another example, the detection component 810 may communicate indirectly with the processing component 820 via the communication component 850. That is, all of the components 810-850 of the system 800 may communicate directly with each other and/or indirectly via the communication component 850, as described above.

As discussed above, the components, elements, and/or functionality of the system 800 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Figure 10:
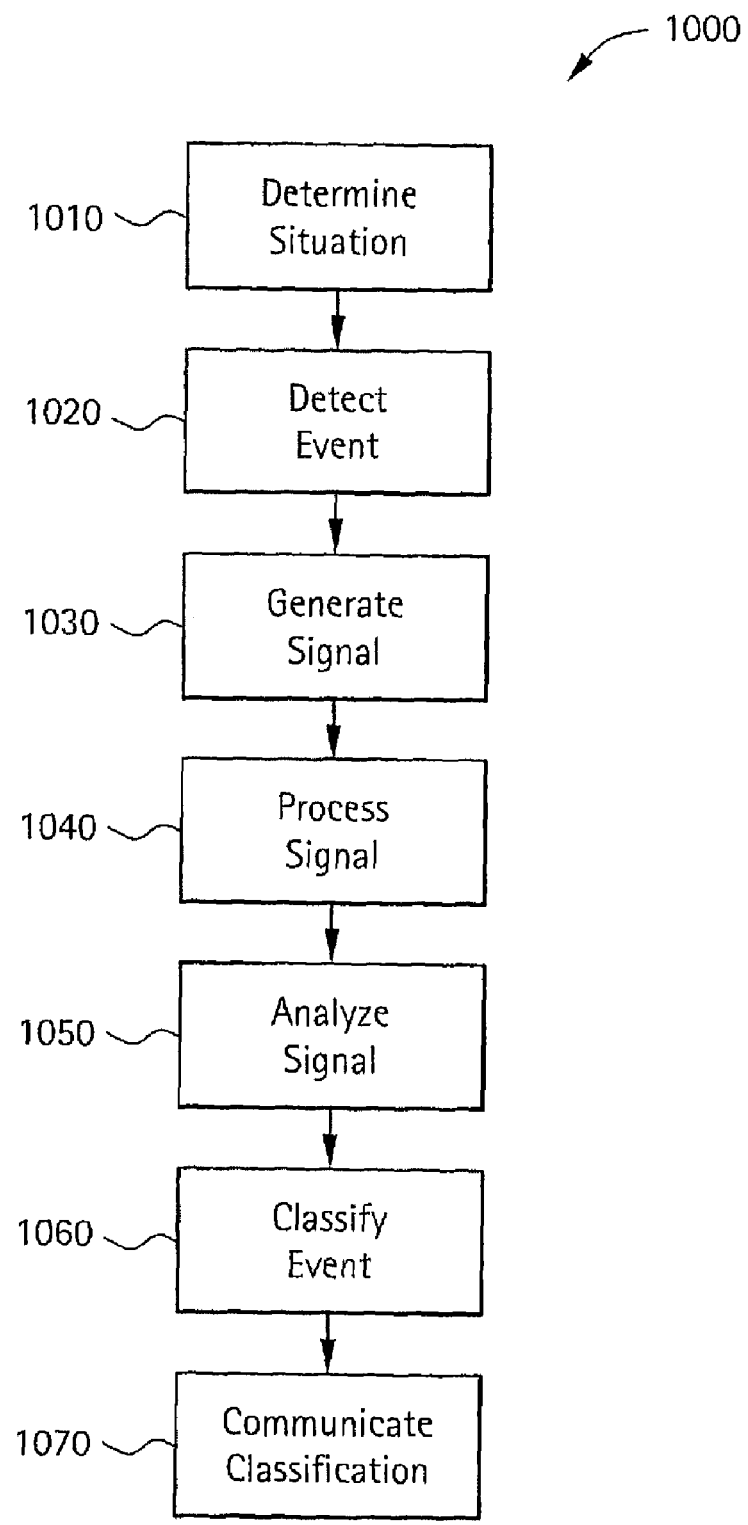
FIG. 10 illustrates a method 1000 for improved signal processing within a remote sensor system according to an embodiment of the present invention.

FIG. 10 illustrates a method 1000 for improved signal processing within a remote sensor system according to an embodiment of the present invention. At step 1010, a situation is determined. At step 1020, an event is detected. At step 1030, a signal is generated. At step 1040, the signal is processed. At step 1050, the signal is analyzed. At step 1060, the event is classified. At step 1070, the event is communicated. The method 1000 includes the following steps, which are discussed in more detail below. The method 1000 is described with respect to the system 800, but it should be understood that other implementations are possible.

At step 1010, a situation is determined. For example, the situation may include a target type, an environment or environmental condition, and/or a dynamic environment or a dynamic environmental condition. The situation may be determined, for example, by the system 800 and/or by a user, as described above.

At step 1020, an event is detected, for example, by a detection component, such as detection component 810. For example, a vehicle may be detected by a seismic detector. At step 1030, a signal is generated by the detection component based at least in part on the event. For example, the seismic detector may generate an electrical signal from the seismic vibrations of the vehicle.

At step 1040, the signal is processed, for example, by a processing component, such as processing component 820. The signal may include, for example, the signal generated at step 1030. In certain embodiments of the present invention, the signal may be processed based at least in part on the situation. In certain embodiments of the present invention, the signal may be processed to determine a signal envelope. The signal envelope may be further processed based at least in part on the situation.

At step 1050, the signal is analyzed, for example, by an analysis component, such as analysis component 830. The signal may include, for example, the signal generated at step 1030 and/or the signal processed at step 1040. In certain embodiments of the present invention, the signal and/or the signal envelope may be analyzed, for example, in one or more domains. In certain embodiments of the present invention, the signal envelope may be analyzed based at least in part on the situation.

At step 1060, an event is classified, for example, by a classification component, such as classification component 840. For example, an impulse source may be classified as a person, whereas a constant source may be classified as a vehicle.

At step 1070, the classification is communicated, for example, by a communication component, such as communication component 850.

One or more of the steps 1010-1070 of the method 1000 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

In one embodiment of the present invention, a system for improved signal processing within a remote sensor system includes a detection component and a processing component. The detection component is adapted to detect an event and generate a signal based at least in part on the event. The processing component adapted to process a signal based at least in part on a situation.

In one embodiment of the present invention, a method for improved signal processing within a remote sensor system includes determining a situation, detecting an event, generating a signal based at least in part on the event, and processing the signal based at least in part on the situational parameter.

In one embodiment of the present invention, a computer readable storage medium includes a set of instructions for execution on a computer. The set of instructions includes a detection routine and a processing routine. The detection routine is configured to detect an event and generate a signal based at least in part on the event. The processing routine is configured to process the signal based at least in part on a situation.

Thus, certain embodiments of the present invention provide systems and methods for improved data communication and/or improved signal processing within a remote sensor system. Certain embodiments of the present invention provide the technical effect of improved data communication and/or improved signal processing within a remote sensor system.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any medical navigation system. Certain features of the embodiments of the claimed subject matter have been illustrated as described herein, however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A system for improved signal processing within a remote sensor system, the system including:
    a selection component configured to select a situation from a plurality of selectable situations;
    a detection component configured to detect an event and generate a signal based at least in part on the detected event; and
    a processing component configured to:
        determine at least one processing parameter based at least in part on the selected situation, wherein the at least one processing parameter indicates at least one reference value, and
        process the generated signal based at least in part on the determined at least one processing parameter.

2. The system of claim 1, wherein the detection component includes at least one of a seismic detector, an acoustic detector, a magnetic detector, and a passive infra-red detector.

3. The system of claim 1, wherein the at least one reference value indicated in the determined at least one processing parameter includes at least one of a filter bandwidth, a detection threshold, a detection pulse length, a detection pulse spacing, a detection time window length, a detection time window pulse number, an association window length, and an association window threshold.

4. The system of claim 1, wherein the situation includes at least one of a target type, an environment, and a dynamic environmental condition.

5. The system of claim 1, wherein the situation is selected by a user.

6. The system of claim 1, wherein the situation is selected automatically by the system.

7. The system of claim 1, further including a classification component configured to classify the detected event based at least in part on the selected situation.

8. The system of claim 7, wherein the classification component is configured to determine at least one classification parameter based at least in part on the selected situation.

9. The system of claim 8, wherein the determined at least one classification parameter includes at least one of feature selection and feature execution order.

10. The system of claim 7, wherein the classification component is configured to select a feature set from a plurality of feature sets based at least in part on the selected situation.

11. The system of claim 1, further including an analysis component configured to analyze the processed signal.

12. A method for improved signal processing within a remote sensor system, the method including:
using at least one computing device to perform the steps of:
selecting a situation from a plurality of selectable situations;
detecting an event;
generating a signal based at least in part on the detected event; and
processing the generated signal based at least in part on at least one processing parameter determined based at least in part on the selected situation, wherein the at least one processing parameter indicates at least one reference value.

13. The method of claim 12, wherein the at least one reference value indicated in the determined at least one processing parameter includes at least one of a filter bandwidth, a detection threshold, a detection pulse length, a detection pulse spacing, a detection time window length, a detection time window pulse number, an association window length, and an association window threshold.

14. The method of claim 12, wherein the situation includes at least one of a target type, an environment, and a dynamic environmental condition.

15. The method of claim 12, wherein the situation is selected by a user.

16. The method of claim 12, wherein the situation is selected automatically.

17. The method of claim 12, further including classifying the detected event based at least in part on the selected situation.

18. The method of claim 17, wherein the classifying step includes determining at least one classification parameter based at least in part on the selected situation.

19. The method of claim 18, wherein the at least one classification parameter includes at least one of feature selection and feature execution order.

20. The method of claim 17, wherein classifying step includes selecting a feature set from a plurality of feature sets based at least in part on the selected situation.

21. The method of claim 12, further including analyzing the processed signal.

22. A computer readable storage medium including a set of instructions for execution on a computer, the set of instructions including:
a selection routine configured to select a situation from a plurality of selectable situations;
a detection routine configured to detect an event and generate a signal based at least in part on the detected event; and
a processing routine configured to:
determine at least one processing parameter based at least in part on the selected situation, wherein the at least one processing parameter indicates at least one reference value, and
process the generated signal based at least in part on the determined at least one processing parameter.

* * * * *